Patented Oct. 25, 1927.

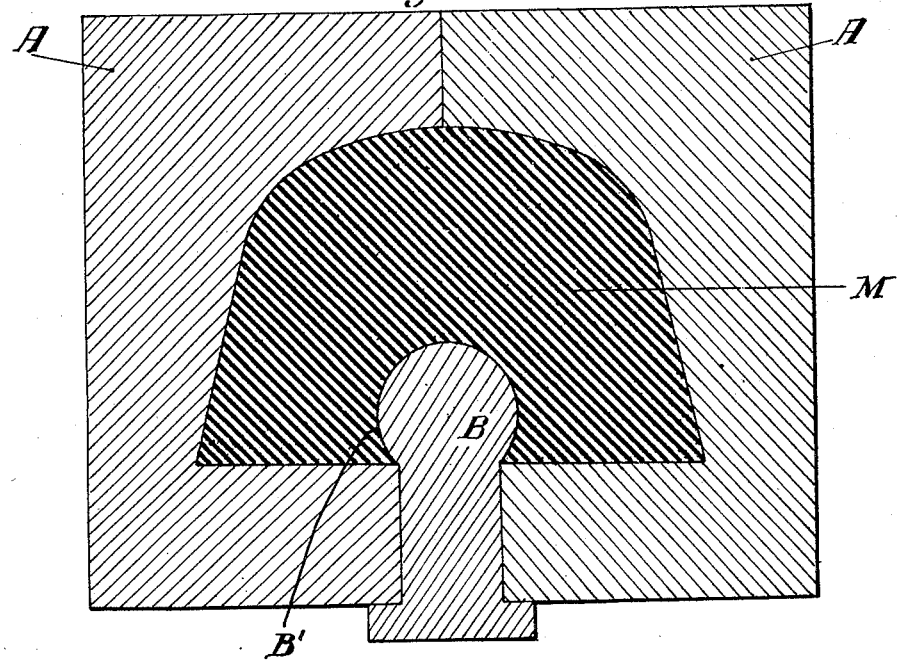
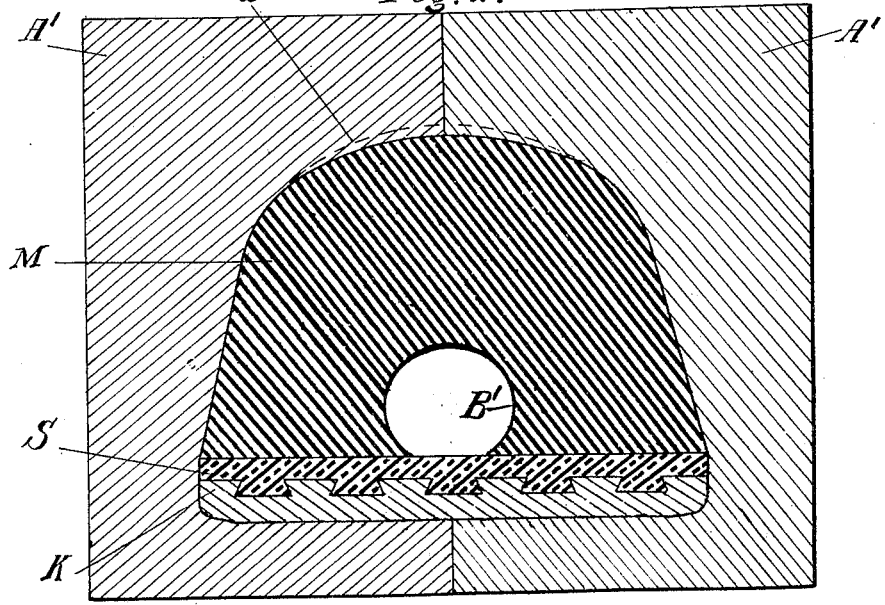

1,646,800

UNITED STATES PATENT OFFICE.

ALDO VALENTINI, OF MILAN, ITALY.

AIR-CORE TIRE.

Application filed April 27, 1926, Serial No. 104,959, and in Italy May 9, 1925.

My invention relates to a new type of semipneumatic tires for wheels of omnibuses or industrial vehicles consisting of a solid tire built on a single metal band and having a continuous internal air chamber.

Considering on the one hand the insufficient softness and resiliency of solid tires and the inconveniences and objections to which they give rise, such as slight comfort to passengers and greater wear on the engine, and on the other hand the higher cost and shorter mileage of, and the frequency of repairs to, pneumatic tires, which result in a higher average cost per mile as far as the latter tires are concerned, manufacturers have tried to arrive at an intermediate solution which would retain the advantages of both the above types and would do away with their respective defects and faults.

The most promising solution that has been found up to now consists in the use of tubular or air core tires, i. e., solid tires having one or more internal cavities. Owing to difficulty of manufacture all tubular or air core tires manufactured up to now have been mounted on metal rims, bands or the like which are split, either partly or entirely along their middle or have holes in their inner faces. It has been necessary to do this in order to enable the extraction of the cores that are introduced inside the cavity during the vulcanization.

Such procedure offers, however, the following very serious disadvantages:

1. The steel band or rim thus split, cut or perforated is much less resistant than the unsplit bands on which ordinary solid tires are mounted and is more liable to be damaged. This liability to damage is particularly serious when the tire projects over the wheel rim.

2. The inner cavity is necessarily open, which allows advantage to be taken only of the greater elasticity or softness due to the presence of such cavity, while it does not make use of the elasticity of the air contained therein.

The chief object of the present invention on the other hand is to build a tubular tire or a solid tire having an internal annular cavity, on an unsplit steel band or rim or foundation, similar to those that are used for the manufacture of ordinary solid tires. The inner cavity thus obtained is air-tight and, hence, allows full use to be made of the elasticity of the air contained therein.

In order that the said invention may be clearly understood, and readily carried into effect, I shall hereinafter fully describe the process of manufacture of such tires, with reference to the accompanying drawings, in which Figure 1 is a sectional view showing the preliminary treatment to which the tire is subjected, and Fig. 2 is a similar view showing the succeeding treatment.

A tread element M is first prepared by any of the usual methods, preferably by forcing a suitable rubber compound through a tube-making machine. This tread, to the lower surface of which a sheet of hard rubber mixture may, if desired, be applied, is placed in an iron or steel mould A, A (Fig. 1), after having had introduced in its interior cavity B' a core B, which prevents the deformation of the said cavity and ensures its exact shape.

The tread in these conditions undergoes a pressing operation and a preliminary vulcanization.

After this first procedure, the tread is removed from its mould and is freed from its core and applied to an ordinary, i. e. continuous and entire, circular steel band or rim K (Fig. 2) on which a sheet of hard rubber S has been previously laid.

This rim or band may have in its central zone a few small holes, e. g. three or four, which are filled after the completion of the tire.

The tread thus applied on its rim, is then introduced into a circular mould A' (Fig. 2) of which the internal capacity is slightly smaller than that of the previous mould, the difference between the internal capacities of the first and second moulds being shown by the continuous line and the dotted line a.

The whole then undergoes a second vulcanization during which the mould A' by reason of its smaller internal capacity as stated above, affords an internal pressure which is sufficient to cement strongly the tread M to the sheet S of hard rubber applied to the circular steel rim K.

After that, the tire is taken out and the small holes (if any) in the central zone of the rim are filled by welding.

Having now particularly described and ascertained the nature of my said invention, and in what manner the same is to be performed, I declare that what I claim is:

A process of manufacturing air core tires, comprising the steps of subjecting a preformed tubular rubber element to partial vulcanization around a rigid core to shape its central cavity; separating the partially-vulcanized element from the core; applying a hard rubber sheet against the inner face of said element, and a steel band against the inner face of said sheet; and subjecting the unit formed by the rubber element, rubber sheet and steel band to final vulcanization and pressure to permanently unite the several parts.

In testimony whereof I affix my signature.

ALDO VALENTINI.